Oct. 26, 1948.   E. S. LONG   2,452,382
APPARATUS FOR MOLDING RUBBER AND PLASTIC MATERIALS
Filed April 30, 1945   2 Sheets-Sheet 1

Inventor
Emmet S. Long
By Lyon & Lyon
Attorneys

Oct. 26, 1948. E. S. LONG 2,452,382
APPARATUS FOR MOLDING RUBBER AND PLASTIC MATERIALS
Filed April 30, 1945 2 Sheets-Sheet 2
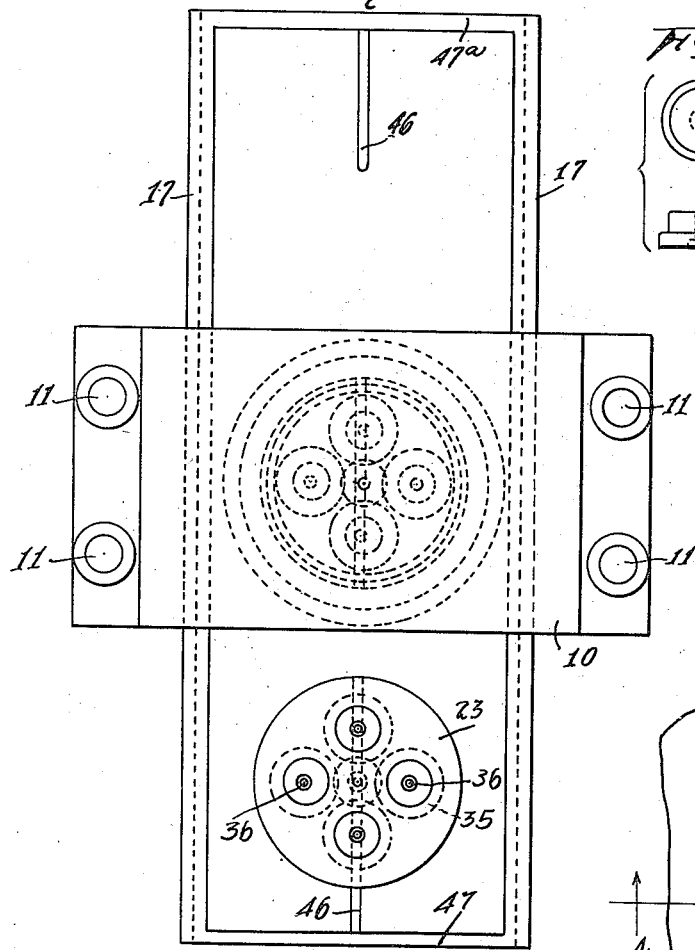
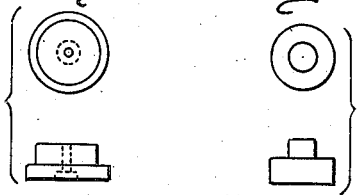
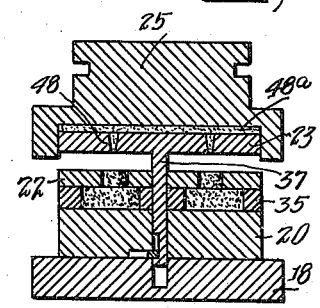
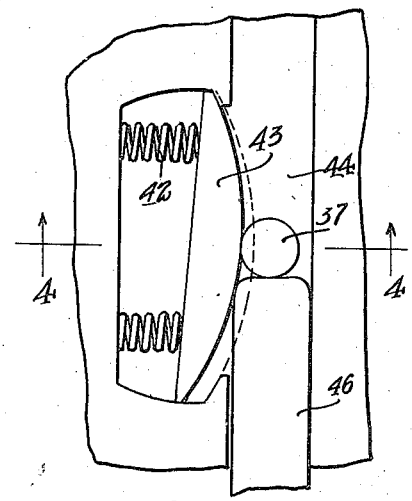
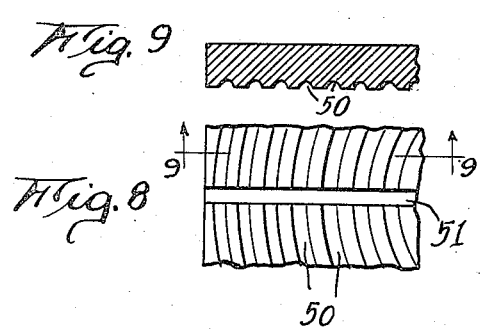
Inventor
Emmet S. Long
By
Lyon & Lyon
Attorneys Patented Oct. 26, 1948

2,452,382

UNITED STATES PATENT OFFICE 2,452,382

APPARATUS FOR MOLDING RUBBER AND PLASTIC MATERIALS

Emmet S. Long, Los Angeles, Calif.

Application April 30, 1945, Serial No. 591,162

2 Claims. (Cl. 18—16)

This invention relates to an apparatus for molding articles of rubber, plastic, and the like.

In my French Patent No. 829,604, issued April 5, 1938, there is described a method and apparatus for molding rubber and plastics by means of which the rubber and plastic materials are extruded from a supply of material placed in one part of a mold containing a plurality of mold cavities for forming separate articles, the material being extruded from the original source of supply into the cavities through intercommunicating channels. The method and apparatus of my French patent were difficult to operate, due to the difficulty of establishing and maintaining the desired vacuum and the difficulty of separating the molds so that the produced articles could be easily separated one from the other.

It is the general object of the present invention to provide apparatus for molding plastic articles by means of which process there may be effected a reduction of the rubber involved, and a lowering of the upkeep and maintenance cost.

More particularly, one of the objects of the present invention is to provide a means by which the articles, after the completion of the molding operations in the mold, may be properly and rapidly separated one from the other and from the remainder of the body of charging material through a separation of the mold members carried out to assure the shearing of the intercommunicating channels between the individual mold cavities and the material so that the separation of the molds results in the produced molded articles being separate from each other but retained in portions of the mold from which such produced articles may all be simultaneously ejected by transferring the portion of the mold holding the articles to templets for simultaneously ejecting the articles.

The apparatus of the present invention, together with various further objects and advantages of the invention, will be more fully understood from the following description of the preferred forms or examples of the invention. I have, therefore, described the preferred form or example of the invention in connection with the accompanying drawings, in which Figure 1 is a side elevation of an apparatus embodying the invention, showing parts of the molding press in section.

Figure 2 is a top view of Fig. 1.

Figure 3 is an enlarged, fragmentary bottom view of the molding plate and locking arrangement.

Figure 5 is a somewhat diagrammatic elevation of the molding apparatus in which the shape of the molds are slightly modified for simplification in illustrating the step of molding a solid article by the process of the present invention.

Figure 6 is a side view of an individual article as molded in one of the cavities of the apparatus shown in Fig. 1.

Figure 7 is a similar view of an article molded in the form of the cavity shown in Fig. 5.

Figure 8 is an enlarged, fragmentary plan view of one of the surfaces of one of the molding plates, showing the channels for distributing the vacuum.

Figure 9 is a fragmentary section on the line 9—9 of Fig. 8.

Figure 1:
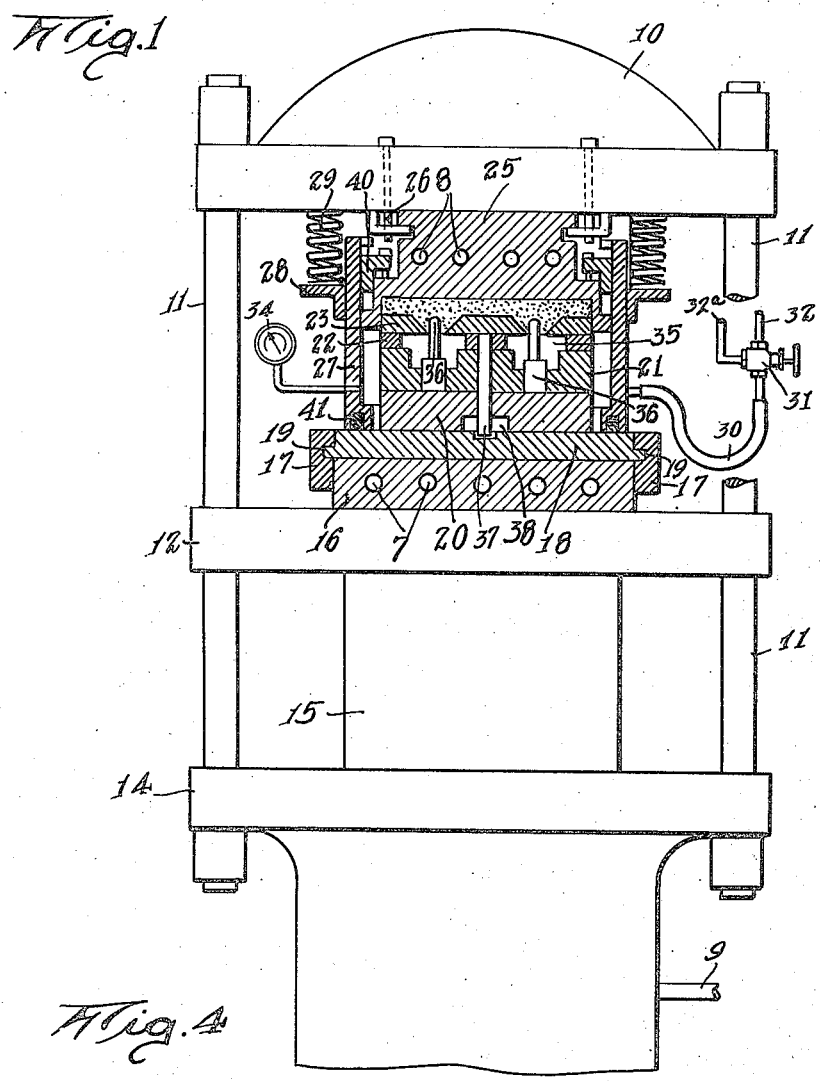

Referring to the drawings, the apparatus of the present invention may be formed, if desired, from any standard press, hydraulic or otherwise, through slight alterations of the press and the addition of the parts herein described. For example, the apparatus may comprise a press head 10 supported by tie rods 11 which are fixed in the base 14 of the press. 15 indicates a ram of a press which may be elevated and lowered in any desired manner, such as by introducing hydraulic fluid through the pipe 9 to the hydraulic cylinders located within the base 14. The ram 15 supports, and is attached to, a moving press table 12 and therefore provides for vertical movement of the press table. The press table 12 is preferably guided by tie rods 11.

There is provided a lower platen 16 fixed to the top of the press table 12 and this platen, as well as the top platen 25, may be chilled or maintained at any predetermined temperature as required by the plastic being molded. For this purpose openings 7 and 8 are shown in the platens 16 and 25, respectively, for introducing the desired means for heating or cooling such platens, as may be required by the molding operations. Since means for heating or cooling of the molds are well-known in the art, any such means may be employed in the method of the present invention and no specific means are herein described. The lower platen 16 is provided on its opposite sides with side rails 17 which project laterally from the press, as shown in Fig. 2, a sufficient distance to allow one of said platens to be at either side of the press and accessible to an operator while another set of platens is in the press and in use in a molding operation. Each side rail 17 is grooved as indicated at 19 to accommodate the tongues of a sliding plate 18. The plate 18 may be thereby slid upon the rails 17 to the stops 47 or 47a connecting the ends of the rails. It will thus be seen that as one molding unit mounted on its plate 18 is slid into the press its plate 18 will contact the plate of the companion unit, forcing that plate within the press to the other side of the press. The stops 47 and 47a are so adjusted that when one of the plates 18 of one of the units is forced against one of the stops 47 or 47a and the plate of another unit contacted therewith, such other unit will be exactly under the center of the press. The lateral force necessary to slide the molding members on the rails 17 may be provided manually but if the rails are large and heavy mechanical means (not shown) may be provided for moving the same.

A base plate 20 is fixed to the sliding plate 18 and recessed at 38 in order to receive a locking mechanism, to be hereafter described. The top surface of the plate 20 provides a base upon which there may be mounted the respective bottom plates of various molding members, such as the molding members 21. It is to be understood that any suitable means (not shown) such as screws or bolts may be supplied for fixing the molding members 21 to the plate 20.

In Figure 1 molds are shown designed to produce articles similar to those illustrated in Figure 6. It is customary to provide the molding members with several hundred cavities, particularly when the articles to be produced are relatively small, but for the purpose of simplifying the illustration of the press of the present invention, I have shown the molds in Figure 2 as containing only four cavities, indicated at 35, of which two of the cavities are shown in section in Figure 1.

Where the article to be molded is intended to have an axial hole a pin or wire 36 is provided in the center of the cavity, usually extending as indicated above the surface of the intended article. For the type of mold shown there is provided a central mold plate 22 and a top mold plate 23, which can be easily removed to facilitate withdrawing the mold from the press. Pins 36 project partially through the top plate 23 into cone shaped holes in the top plate 23. The small annular space resulting from the loose fit provides a communication by which the molding material may flow from the pressure and supply chamber into the individual mold cavities.

As indicated, all of the mold cavities receive their supply of material from a single supply chamber which is formed by recessing the top plate 25 so as to receive the molding plate 23, the sides of the molding plate 23 fitting the sides of the recess and plate 25 as tightly as practice will permit. Two or more finger clamps 26 provide a convenient means for fixing the top plate 25 to the press head 10 and allow the top member to be adjusted into accurate alignment with the top mold plate 23.

Figure 4:
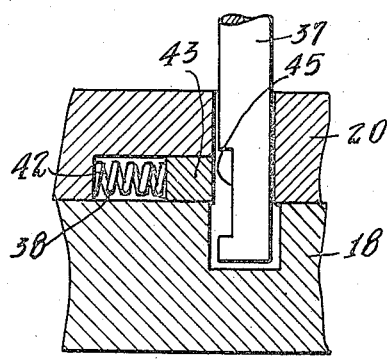
Figure 4 is a fragmentary section substantially on the line 4—4 of Fig. 3.

A pin 37 is fixed to the top plate 23 and passes through holes in the middle molding plate 22 and lower plate 20 into the cavity 38. For large molds more than one of such pins may be required, but for the small molds, one will be satisfactory. This pin 37 acts as a dowel to lock and maintain concentrically the various molding plates; it also provides means for withdrawing the top mold plate 23 from the supply chamber, providing a locking device as shown in Figures 3 and 4. The bottom of the pin 37 is slotted, as indicated at 45. A sliding key 43 is provided in the recess 38 which is urged by springs 42 towards the slot 45. It is to be noted that the width of the slot 45 is considerably greater than the thickness of the key 43. This excess permits a certain amount of relative movement between the pin 37 and the plate 20 before the bottom of the slot contacts the key 43, after which the pin is locked and there can be no further relative movement until unlocking is accomplished by pushing the key against the pressure of the springs 42 a sufficient distance to clear the slot. When the key has been withdrawn sufficiently to clear the slot, the pin 37 and the top plate 23 to which it is fixed may then be completely withdrawn from all the mold plates.

Locking and unlocking of the pin 37 is accomplished in the use of the apparatus automatically as follows: When the sliding plate 18 is in its central position, i. e. in the press, the key 43 is free to move laterally and will assume the position shown by the dotted line in Figure 3, wherein the pin 37 is locked. When the sliding plate 18 is withdrawn from the press in either direction and one of the tongues 46 fixed to the stops 47 and 47a will enter the opening 44 (Figures 2 and 3) and engage the key 43 to move the same laterally sufficiently to release the pin 37. By this means, and without any attention from the operator, the pin 37 is automatically unlocked when the molding members are withdrawn from the press and automatically locked when under the press.

Means are provided for enclosing the molding elements so that they may be maintained under vacuum in operation and for this purpose there is provided a cylinder 27 which fits the periphery of the plate 25; it is free to move vertically and springs 29 engaging the annular bracket 28 yieldingly urge the cylinder 27 downwardly. Leakage between the plate 25 and the cylinder 27 is prevented by packing in a stuffing box 40. The base of the cylinder is provided with an annular recess to hold the packing ring 41 which engages the sliding plate 18 and prevents leakage of vacuum between the cylinder and said sliding plate when the plate 18 is in raised position to contact the ring 41.

By this means the space surrounding the molding elements inside the cylinder 27 is entirely sealed against atmospheric pressure and may be evacuated through a flexible tube 30 which leads to a two-way valve 31 whose inlets 32 and 32a are respectively connected to an air pressure supply (not shown) and a vacuum supply or exhaust means (not shown). One position of the valve allows the cylinder 27 to be evacuated to the amount desired, as indicated by a vacuum gauge 34, while a second position of the valve handle permits the same space to be filled with air under pressure considerably higher than atmospheric pressure.

Preferably, the valve 32 is designed to have an intermediate position where neither vacuum nor compressed air is supplied and in certain cases the valve may even provide means for venting the device to the atmosphere.

In certain molding operations, it is desirable to insure equal pressure distribution between the parts of the mold, and for such purpose there is provided on either the bottom surface of the molding member 23 or on the top surface of the molding member 22 a series of intercommunicating grooves or channels, of the form indicated in Figures 8 and 9. Circular orifices 50 joined by radial grooves 51 are located between the rows of mold cavities, these grooves extending close to the cavities but never actually into the cavities as otherwise the molding material would escape from the cavity into the channels while the cavities were being filled. These grooves serve the purpose of facilitating the escape of air from the cavities during the evacuation operation and also to facilitate the admission of compressed air between the cavities as hereinafter described.

Frequently the top mold plate 23 will be relatively thin in which case the top surface of the underlying plate 22 will also enter the supply chamber formed in the recess in plate 25, in which case the plate 22 should not fit the recess in the top plate too tightly or the grooves will be cut off from communication with the line 30. Therefore the underlying mold plate should be slightly smaller in diameter than the top mold member 23 in order to assure the proper distribution of pressures during the molding operation.

With the apparatus thus described, the operation is as follows: It is to be understood, of course, that in the machine there are two sets of the sliding plates 18 with the molding members mounted therein, although only one set may be used. When two sets of plates are employed, one is between the presses while the other is to the side and against the stops 47 or 47a, and in the cycle of operation the sliding plate 18 of one unit will carry the other unit in and out of the press so that each unit may be successively brought into the press and successively withdrawn therefrom for discharge of the molded members. It is to be understood, however, that in operation the two units may be identical or in some cases differ in the type of articles they produce. By providing two units, one unit may be unloaded or reloaded outside of the press while the other is undergoing molding and curing cycles in said press.

In the process, a charge of molding material or a sheet of unvulcanized rubber or other plastic material compound, or a quantity of molding powder, as the case may be, is placed upon the top of the molding plate 23. Sufficient quantity of the molding material is placed on the top of the molding plate or member 23 as to be capable of filling all the mold cavities and provide an excess. The excess is employed to insure the maintenance of press pressure upon the material at each mold cavity through the subsequent curing cycle. With insufficient material the cavities would not be completely filled, and the press pressure would be taken only by the mold plate, in which case the articles produced will generally be of a very inferior quality. Many plastics must be subjected to pressure in the order of 1,000 to 2,000 lbs. per square inch during their heat treatment.

The assembly of molding plates is now moved into the pressing operation and hydraulic fluid is admitted to the press cylinder, and the ram raised until the top surface of the sliding plate 18 contacts the packing ring 41 and the cylinder 27 starts moving upward against the pressure of the spring 29. A seal is now effected against the cylinder and sliding plate at this point. The upward travel of the ram is stopped until the space within the cylinder has been evacuated by operating the valve 32. If desired, this operation of evacuation may be automatic by arranging the valve 32 to be controlled so that the upward movement of the press table will, at the desired point, cause the valve 32 to be operated so as to evacuate the cylinder by means well-known to the art. The vacuum thus created draws air from the cavities through the intercommunicating channels 50 and 51. These channels do not extend into the cavities themselves and when the molding plates 22 and 23 are pressed tightly together, as they will be subsequently when the top plate enters the compression chamber in member 25, the channels are cut off from the mold cavities and neither air nor mold materials can escape from the cavities into the channels.

At first, however, the top plate 23 is allowed to rest loosely upon the plate 22 so that the relative pressure of the air in the cavities is sufficient to slowly elevate the top plate 23 and permit part of the air in the cavity to escape through the channels. In some cases it may be desirable to provide additional precaution to insure the removal from the mold cavities of all of the air, and for this purpose additional means are provided to secure a slight separation between the two plates 22 and 23 which may be employed for the insertion of small springs or spring washers, facilitating a slight raising or separation of the plates 22 and 23 until the heavier press pressure is applied. As soon as the heavy pressure is applied to the top plate 23 such springs will be compressed into the cavities and permit the two plates to firmly contact each other, thereby cutting off communication. During the evacuation, air will be simultaneously drawn from the press chamber 25 through the orifices in the top plate 23 and if granular mold material is used the air between the granules will also be withdrawn. The evacuation of the cavities in the press chamber and the removal of air from the mold eliminates many of the difficulties encountered in the present methods of molding where no effective means of removing the air is possible. The finished articles produced in this process are much superior in equality, due to the absence of porosity, blisters and surface blemishes caused by trapping of air. After sufficient time has elapsed for the evacuation of cavities, usually 5 to 10 seconds is ample, a hydraulic valve admitting pressure to the press ram is opened to complete the upward travel of the molds and no further operations are then required until the curing, heat treatment or chilling as the case may be, is completed. After the top plate 23 enters a sufficient distance into the chamber 25, the molding material will be compressed. If heating is required to further force the material through the communicating orifices in the top plate 23 into the mold cavities, until they are completely filled, the aforesaid excess or surplus molding material will remain as a thin sheet on the upper side of the molding plate 23, as shown at 48a in Figure 5.

When the heat treatment is completed, the valve 32 is operated to admit compressed air into the cylinder 27. This air enters the intercommunicating channels between mold plates 22 and 23 and builds up the pressure therein, exerting a force that tends to separate these two plates. If the air pressure is sufficiently high separation will occur as soon as the hydraulic press in the cylinder 14 is released.

It is an important feature of the process and apparatus of the present invention that means are provided to effect the first separation between the molding members 22 and 23 instead of between the plate 23 and chamber 25. By effecting the first separation between the plates 22 and 23, I break all of the cores of material in the orifices 48, interconnecting the sheet 48a, with the molded articles produced. This breaking occurs, usually, at the point of minimum cross-sectional area, or just at the top of the molded article. During this process the sheet 48a, due to natural adhesion to the walls of plates 25 and 23, facilitates the operation of breaking the molding members apart first between the plates 22 and 23. Where the separation is first effected between plates 23 and 25 the subsequent process of removing the molded articles from the mold is liable to result in a stripping of the sheet of material 48a into ribbons and to effect a plugging-up of part of the orifices in the member 48a while leaving considerable material adhering to the molded articles. Either of such effects involve considerable extra labor or material.

In the process of the present invention, it is desirable, as pointed out, that the top molding member 23 should be withdrawn after, and not before, the severing of the material in the orifices of the plate 23 from the completed molded article in the cavity of the molding members 22 and 21. The removal of the top plate 23 from the pressure chamber after the breaking operation, is automatically obtained as follows:

The slot 45 in the pin 37, as seen in Figures 4 and 5, determines the maximum amount of separation which may take place between the plates 22 and 23. Where a stretchable material, such as rubber, is being molded, a separation of over half an inch may be required to sever the material in the orifices 48 and the slots 45 should be proportioned with reference to the width of the key 43 so as to allow this amount of stretch to be exceeded so as to assure severing of the material. As soon as the limits of the slot 45 have been passed the key 43 stops any further relative movement and the continued downward movement of the press table 12, by means of the pin 37, withdraws the top plate 23 from the supply chamber formed in the plate 25. The downward travel of the press table 12 may be effected solely through the force of gravity acting upon the ram and parts resting thereon, the force of the spring 29 and the force of the compressed air admitted into the cylinder 27, but obviously backward pressure rams can be installed where necessary.

When the press has completed its downward stroke the top of the material on plate 18 is below the bottom of the cylinder 27, the assembly may be moved out of the press on the side rails 17 and the companion molding apparatus moved into the press. As before described, when the molding assembly is moved on the rails 17, the molding plate 23 is automatically unlocked.

While the particular form of the apparatus of the present invention herein described is well adapted to carry out the objects of the invention, it is to be understood that various modifications and changes may be made, and this invention is of the scope set forth in the appended claims.

I claim:

1. An apparatus for molding articles comprising means forming a supply chamber for molding material, molding members, one of said molding members having openings communicating with said supply chamber, said molding member being movable relative to the remaining molding members, said molding members providing molding cavities, means for evacuating said molding cavities, means for exerting pressure on the molding material in said supply chamber for forcing a part, but not all, of said material into said cavities through said openings, while forming cores of material connecting the molding material in said cavities with residual material in said supply chamber, means for introducing air pressure between said residual material and the molding material in said cavities for moving the molding member having said openings relative to the remaining molding members for severing said cores, and means for positively moving the molding member having said openings relative to the residual material after severing of said cores.

2. A molding apparatus comprising relatively movable press members, molding members actuated by one of said press members, which molding members are relatively movable, one of said molding members cooperating with one of said press members for forming a supply chamber for molding material, said molding member having openings leading into the mold cavities provided by said molding members, means for moving said press members to apply pressure to molding material in said supply chamber to force a part, but not all, of the same into said cavities through said openings, while forming cores of material in said openings connecting the molding material in said cavities with the residual molding material in said source of supply, means for introducing air pressure between the residual material and the molding material in said cavities to separate the molding member having said openings from the remainder of the molding members and thereby sever said cores, and means operating only after a limited movement of said press members for positively relatively moving the molding member and press member which cooperate to form said supply chamber.

EMMET S. LONG.

REFERENCES CITED

The following references are of record in the file of this patent:

UNITED STATES PATENTS

| Number | Name | Date |
|---|---|---|
| 2,027,164 | Grubman | Jan. 7, 1936 |
| 2,072,349 | Wayne | Mar. 2, 1937 |
| 2,339,541 | Bosomworth et al. | Jan. 18, 1944 |

FOREIGN PATENTS

| Number | Country | Date |
|---|---|---|
| 426,914 | France | Mar. 7, 1911 |
| 829,604 | France | Nov. 20, 1937 |